United States Patent
Kominato et al.

(10) Patent No.: US 10,094,968 B2
(45) Date of Patent: Oct. 9, 2018

(54) VEHICULAR DISPLAY APPARATUS

(71) Applicants: NIPPON SEIKI CO., LTD., Nagaoka-shi, Niigata (JP); HONDA MOTOR CO., LTD., Tokyo (JP)

(72) Inventors: Kazuhiro Kominato, Nagaoka (JP); Atsushi Arisa, Wako (JP)

(73) Assignees: NIPPON SEIKI CO., LTD., Nagaoka-Shi (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/636,304

(22) Filed: Jun. 28, 2017

(65) Prior Publication Data

US 2018/0003884 A1 Jan. 4, 2018

(30) Foreign Application Priority Data

Jul. 4, 2016 (JP) .................................. 2016-132632

(51) Int. Cl.
*B60Q 3/14* (2017.01)
*F21V 8/00* (2006.01)
*B60K 35/00* (2006.01)

(52) U.S. Cl.
CPC ............ *G02B 6/0051* (2013.01); *B60K 35/00* (2013.01)

(58) Field of Classification Search
CPC .............................. G02B 6/0051; B60K 35/00
USPC ........................................................ 362/606
See application file for complete search history.

(56) References Cited

U.S. PATENT DOCUMENTS

| | | | |
|---|---|---|---|
| 2009/0154186 A1* | 6/2009 | Natsume | B60Q 1/0041 362/516 |
| 2010/0008088 A1* | 1/2010 | Koizumi | B60Q 1/0058 362/235 |
| 2012/0200476 A1* | 8/2012 | Kanamori | G02B 27/0101 345/7 |
| 2013/0027903 A1* | 1/2013 | Takahashi | B60K 35/00 362/23.14 |
| 2013/0314891 A1* | 11/2013 | Miyazawa | G01D 13/265 362/23.14 |
| 2016/0048017 A1* | 2/2016 | Kasahara | G02B 27/0101 359/633 |
| 2016/0103269 A1* | 4/2016 | Narita | G02B 6/00 362/617 |
| 2016/0161303 A1* | 6/2016 | Otani | B60K 35/00 116/288 |
| 2017/0052368 A1* | 2/2017 | Takahashi | B60K 35/00 |

FOREIGN PATENT DOCUMENTS

JP 2002-079847 3/2002

* cited by examiner

*Primary Examiner* — Christopher Raabe
(74) *Attorney, Agent, or Firm* — Rankin, Hill & Clark LLP

(57) ABSTRACT

A vehicular display device includes a facing member having a hole formed therein, an edge-light light guide that guides lights emitted from LEDs, a diffusion member that diffuses light leaking from the edge-light light guide, and a convex light guide having a main part interposed between the diffusion member and the facing member, and a projecting portion projecting into the hole. The lights emitted from the LEDs are guided to the edge-light light guide. The lights guided to the edge-light light guide are diffused by the diffusion member to enter the convex light guide, and leaves from the projecting portion.

12 Claims, 6 Drawing Sheets

VEHICULAR DISPLAY APPARATUS

CROSS-REFERENCE TO RELATED APPLICATION

This application claims the benefit of Japanese Patent Application No. 2016-132632, filed on Jul. 4, 2016, the entire disclosure of which is incorporated by reference herein.

FIELD

The present disclosure relates to a display apparatus for a vehicle.

BACKGROUND

Unexamined Japanese Patent Application Kokai Publication No. 2002-79847 discloses a vehicular display device including a casing, and a facing member attached to the opening of the casing. The facing member surrounds the periphery of a display board to hide unnecessary portions of the display board and restrict the visible area thereof. The vehicular display device disclosed in Unexamined Japanese Patent Application Kokai Publication No. 2002-79847 includes indicator displays and ambient displays. Each display includes a slit formed in the facing member, a resin plate disposed at a position in the casing that faces the slit, and a light source that illuminates the resin plate.

In the vehicular display device having such a configuration, the resin plate is directly illuminated by the light source. This produces portions luminance flecks on the resin plate that corresponds to the slit. In addition, when the facing member is viewed from the front side, a step between the inside of the slit and the peripheral portion of the slit is visible. The luminance flecks and the step may give an impression for a viewer, that the vehicular display device has a bad appearance.

SUMMARY

A vehicular display device according to the invention includes:
a light source;
a light guide that guides light emitted from the light source;
a diffusion member that diffuses at least part of the light emitted from the light guide;
a facing member having a hole provided therein so that a portion where the hole is provided overlaps at least a part of the diffusion member; and
a convex light guide having a main portion interposed between the diffusion member and the facing member and a projecting portion projecting into the hole from the main portion.

BRIEF DESCRIPTION OF THE DRAWINGS

A more complete understanding of this application can be obtained when the following detailed description is considered in conjunction with the following drawings, in which.

DETAILED DESCRIPTION

The following describes a vehicular display device according to an embodiment of the invention with reference to the accompanying drawings.

The vehicular display device according to the embodiment is mounted on an automobile, a two-wheeled vehicle, or the like.

Figure 1:
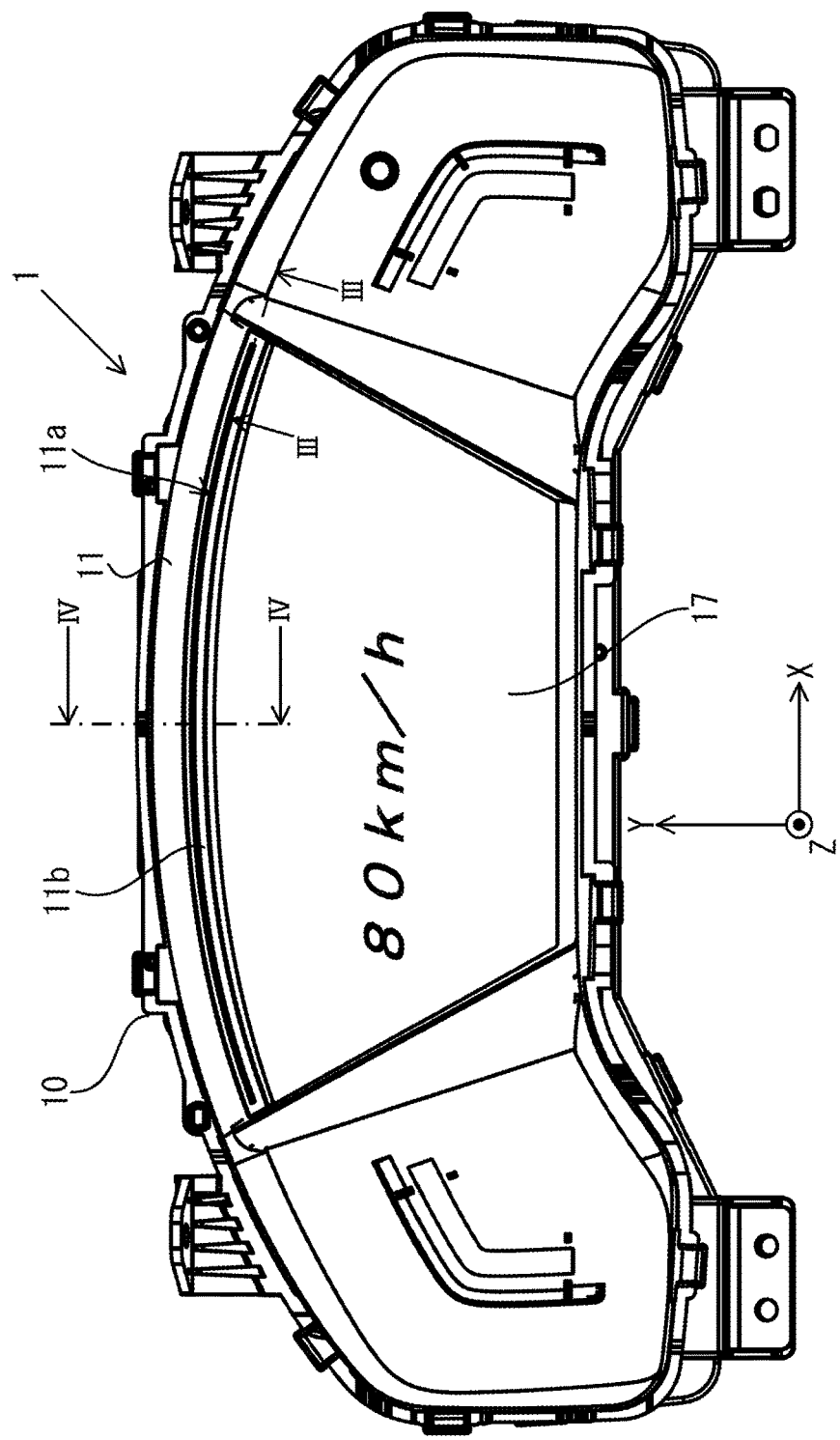
FIG. 1 is a front view of a vehicular display device according to an embodiment of the invention.

As shown in FIG. 1, a vehicular display device 1 includes a casing 10, a facing member (front-side casing) 11, and a display unit 17. The facing member 11 surrounds the periphery of the display unit 17 to hide unnecessary portions of the display unit 17 and restrict the visible area thereof. In the embodiment, the casing 10 and the facing member 11 are integrally formed of a resin or the like.

Figure 2:
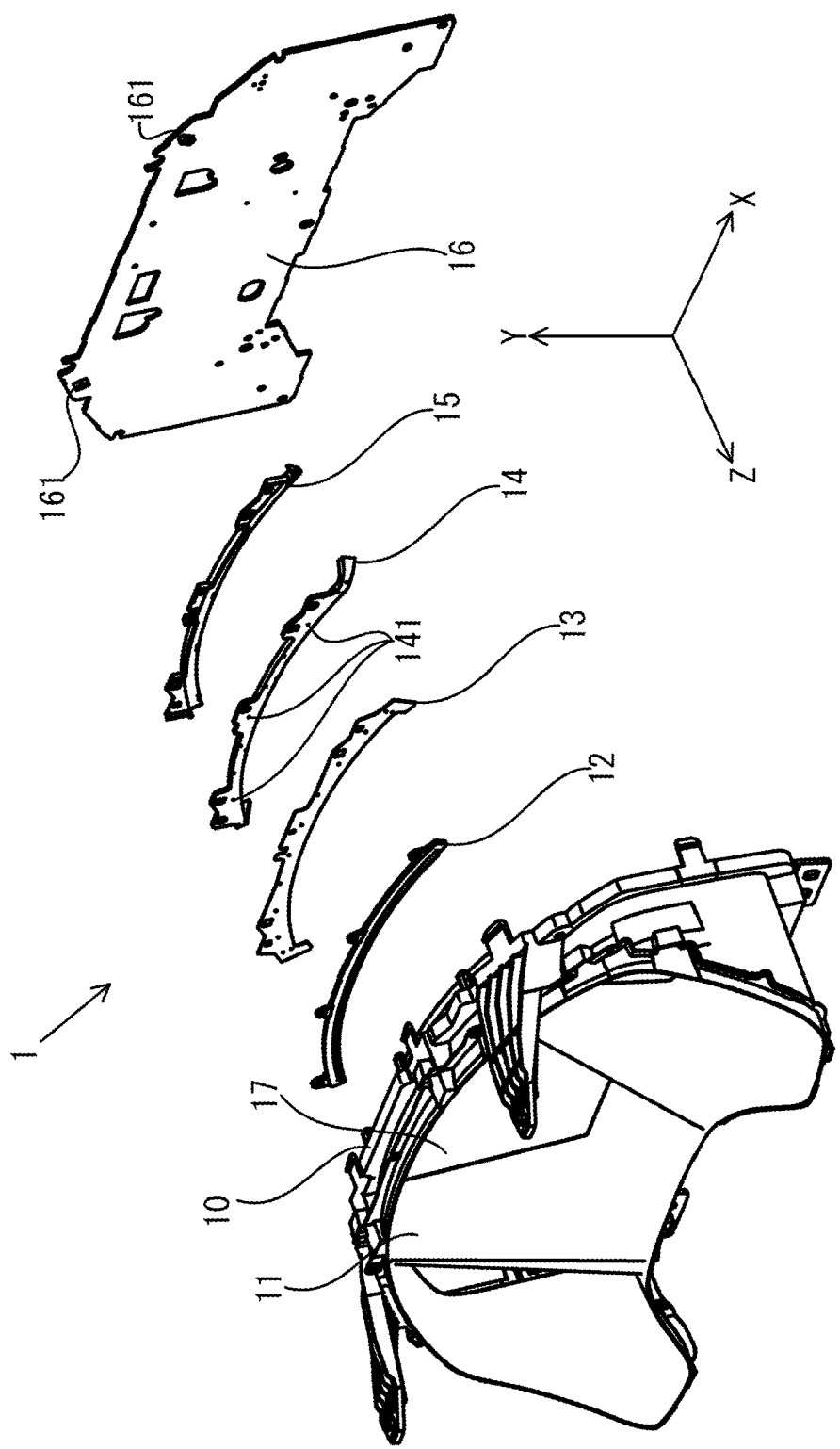
FIG. 2 is an exploded perspective view of the vehicular display device according to the embodiment.

As shown in FIG. 2, a circuit board 16, a reflector 15, an edge-light light guide (light guide) 14, a diffusion member 13, and a convex light guide 12 are disposed in the vehicular display device 1.

In FIGS. 1 and 2, the lengthwise direction of the vehicular display device 1 is defined as an X-axial direction, the short side direction thereof is defined as a Y-axial direction, and the thicknesswise direction thereof is defined as the Z-axial direction. In the following description, a +Y direction is referred to as an upward direction, a −Y direction is referred to as a downward direction, a +Z direction is referred to as a frontward direction, and a −Z direction is referred to as a backward direction. The casing 10 has a flat box shape with the −Z-wise side surface being open.

The display unit 17 includes a display device having a thin film transistor (TFT) liquid crystal display and a backlight. The display unit 17 has a trapezoidal shape having a base curved to be a convex outward in a plan view. The display unit 17 is disposed so that the curved portion in a plan view is the top side. The display unit 17 is disposed substantially at the center of the casing 10.

The circuit board 16 includes a printed circuit board provided with a circuit for supplying electric power to a plurality of light emitting diodes (LEDs) 161. The circuit board 16 is disposed adjacent to the back side of the display unit 17 in the casing 10. The LEDs 161 functioning as a light source are mounted on the circuit board 16.

A reflector 15 is an elongated plate member. The reflector 15 reflects light leaking from the edge-light light guide 14 toward the casing 10. The reflector 15 is slightly curved along its lengthwise direction, and is disposed along the upper edge of the display unit 17 in the casing 10. The reflector 15 is made of, for example, a white polypropylene resin or the like. The reflector 15 is disposed between two LEDs 161 so as not to cover the LEDs 161 disposed on the circuit board 16.

Figure 3:
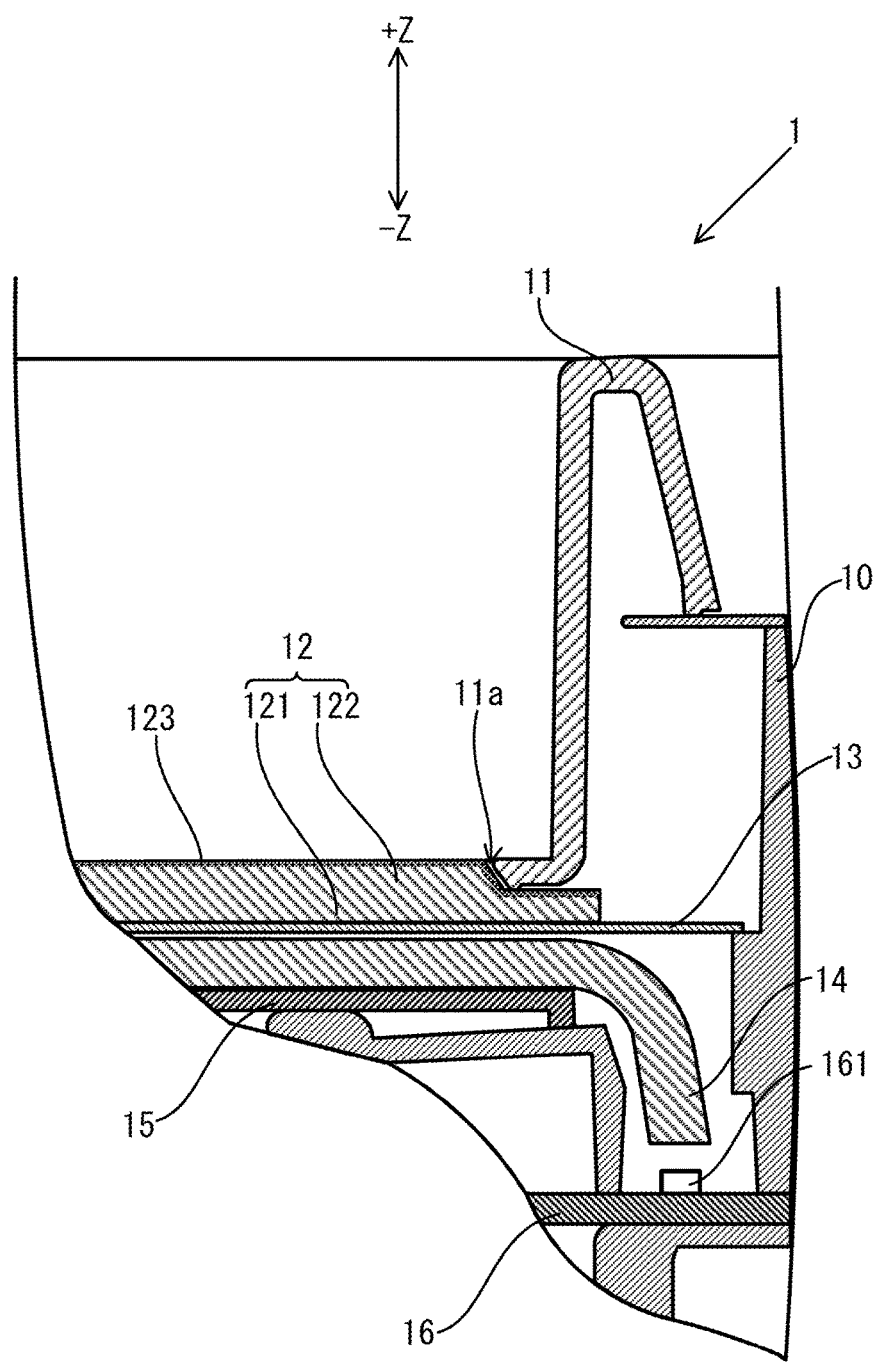
FIG. 3 is a cross-sectional view taken along line of FIG. 1 of the vehicular display device according to the embodiment.
Figure 4:
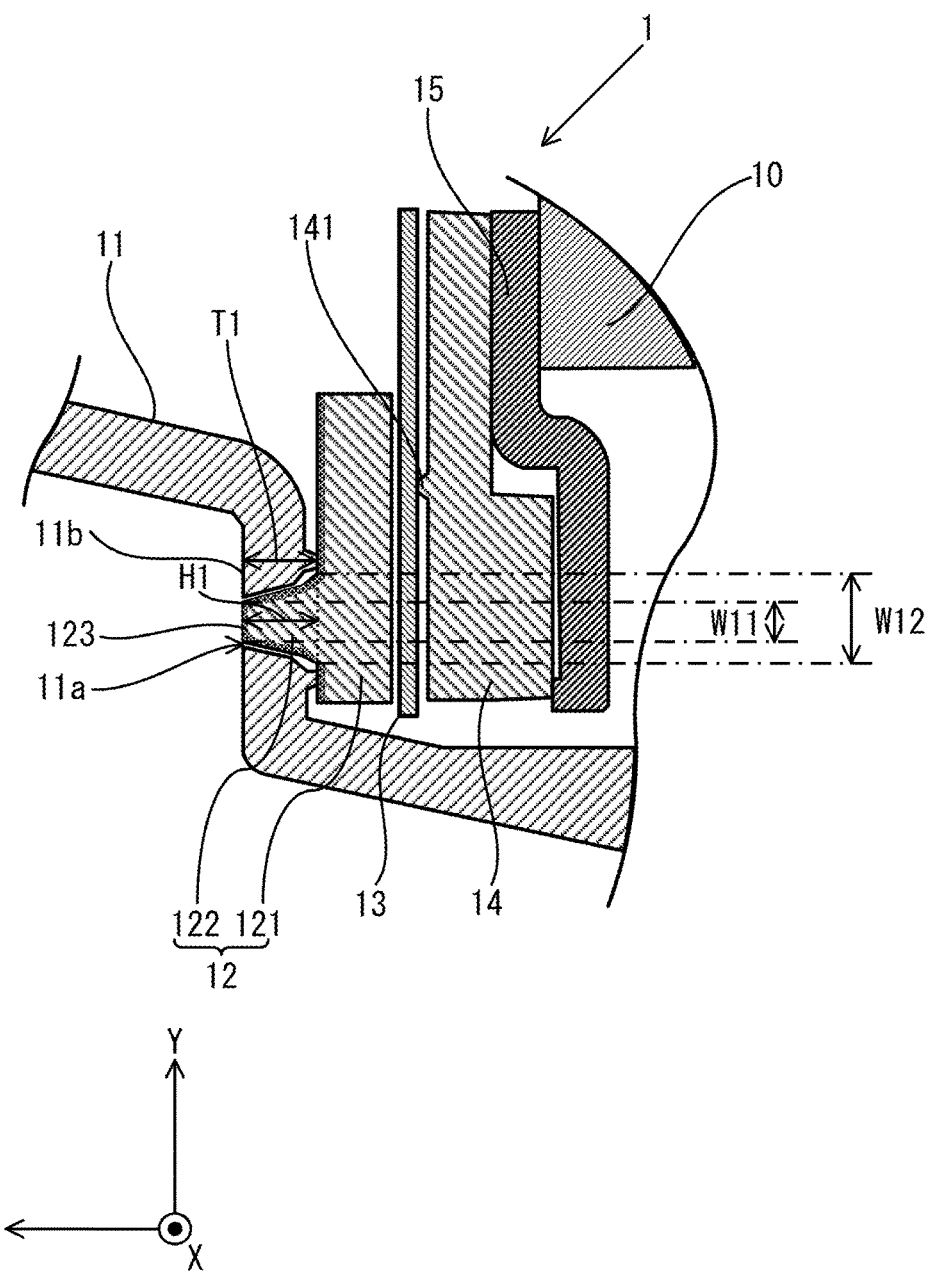
FIG. 4 is a sectional view taken along line IV-IV in FIG. 1 of the vehicular display device according to the embodiment.

The edge-light light guide 14 guides lights emitted from the LEDs 161. The edge-light light guide 14 is a transparent elongated plate member, and is slightly curved along its lengthwise direction. As shown in FIG. 3 which is a cross-sectional view taken along line III-III in FIG. 1, both lengthwise ends of the edge-light light guide 14 are bent to the back side. The edge-light light guide 14 is disposed over the front side of the reflector 15, and has both lengthwise end faces facing the LEDs 161 mounted on the circuit board 16. Further, as shown in FIG. 2 and FIG. 4 which is a cross-sectional view taken along line IV-IV in FIG. 1, the edge-light light guide 14 is provided, at the front side surface thereof, with substantially conical protrusions 141 each having a rounded tip. The edge-light light guide 14 is made of an acrylic resin such as a polymethyl methacrylate resin, a polycarbonate resin, or the like. The lights emitted from the LEDs 161 enter the edge-light light guide 14 from end faces of the edge-light light guide 14, and propagates inside the edge-light light guide 14. Light leaks from the front and back surfaces of the edge-light light guide 14 during propagation. The light leaking from the edge-light light guide 14 toward the reflector 15 is reflected by the reflector 15 to enter the edge-light light guide 14. Accordingly, the loss of light propagating in the edge-light light guide 14 is reduced.

The diffusion member 13 is disposed on the front side of the edge-light light guide 14 to diffuse the light radiated from the surface of the edge-light light guide 14 toward the diffusion member 13. The diffusion member 13 is an elongated plate member formed of a polycarbonate resin or the like, and is slightly curved along its lengthwise direction. The diffusion member 13 is disposed in abutment with the tip portions of the protrusions 141 of the edge-light light guide 14, and a gap (air layer) exists between the diffusion member 13 and the edge-light light guide 14. As a result, the diffusion efficiency of the light emitted from the edge-light light guide 14 toward the diffusion member 13 is improved. A black paint is applied to the back surface of the diffusion member 13 so as to obtain a light-amount gradation such that the amount of light transmitted to the front side decreases from the central portion in the lengthwise direction toward both end portions.

As shown in FIGS. 1 and 2, the facing member 11 is disposed so as to cover the peripheral portion of the display unit 17. The facing member 11 has a design portion 11b as a cover portion to cover the upper edge of the display unit 17. As shown in FIG. 4, the design portion 11b is positioned so as to sandwich the reflector 15, the edge-light light guide 14, the diffusion member 13, and the convex light guide 12 with the casing 10. The design portion 11b is provided with an elongated hole 11a extending along the lengthwise direction thereof. As shown in FIG. 4, the facing member 11 is disposed such that a portion where the hole 11a is provided overlaps a part of the diffusion member 13. The facing member 11 is made of a polypropylene resin or the like, and the surface thereof is embossed. As a result, the reflection of the light incident on the facing member 11 is reduced. It should be noted that other decorations may be made on the surface of the facing member 11.

The convex light guide 12 is elongated as a whole and slightly curved along its lengthwise direction. The convex light guide 12 has a main portion 121 interposed between the diffusion member 13 and the facing member 11, and a projecting portion (convex portion) 122 projecting from the main portion 121 into the hole 11a of the facing member 11. The convex light guide 12 has a light diffusing part 123 that diffuses light near the surface including that portion of the projecting portion 122 which is exposed through the hole 11a of the facing member 11. This light diffusing part 123 is formed by subjecting the +Z directional surface of the convex light guide 12 to embossment or the like. The light diffusing part 123 may be formed by attaching a light diffusion member to the surface of the convex light guide 12. In addition, the convex light guide 12 is formed of a translucent polycarbonate resin or the like. Icons or pictographs may be formed on the surface (exposed surface) of the projecting portion 122. In the cross section in the projecting direction of the projecting portion 122, the shape of the hole 11a of the facing member 13 corresponds to the shape of the projecting portion 122 of the convex light guide 12. Further, the diffusion member 13 and the convex light guide 12 face each other with a gap therebetween.

The height, H1, of the projecting portion 122 of the convex light guide 12 in the projecting direction and the thickness, T1, of the design portion 11b of the facing member 11, i.e., the outer peripheral portion of the hole 11a are substantially equal to each other. Here, "substantially equal to each other" means that the difference between the height H1 and the thickness T1 is 0.5 mm or less. In other words, the exposed surface of the projecting portion 122 and the surface of the design portion 11b are substantially flush with each other. Further, in the cross section parallel to the projecting direction of the projecting portion 122 (the Z-axial direction in FIG. 4), the projecting portion 122 is formed such that the width, W12, of the proximal end portion of the main portion 121 (−Z-wise side) is larger than the width W11 of the distal end portion on the opposite side (+Z-wise side) to the main portion 121. The projecting portion 122 has a trapezoidal shape whose cross section has the base side larger than the upper side.

Next, the operation of the vehicular display device 1 having the foregoing configuration is described. Various kinds of information such as the vehicle speed, the engine speed, and the remaining fuel amount are displayed on the display unit 17 under the control of a control unit (not shown).

The LEDs 161 light under the control of the control unit (not shown). The lights emitted from the LEDs 161 enter the edge-light light guide 14 from the end portion. Thereof the light leaks outside from the top and bottom surfaces while propagating through the edge-light light guide 14. However, the light leaking from the bottom surface of the edge-light light guide 14 is reflected by the reflector 15 to re-enter the edge-light light guide 14.

The light leaking from the top surface of the edge-light light guide 14 passes through the gap, enters the diffusion member 13 from the back surface to be diffused, and leaves from the surface. In addition, the amount of light incident on the diffusion member 13 is reduced, by the black paint, from the central portion toward both end portions in the lengthwise direction thereof. Therefore, the amount of light emitted from the diffusion member 13 toward the front side is reduced from the central portion toward both end portions in the lengthwise direction. Therefore, a gradation of the light emitted from the diffusion member 13 can be obtained.

The light emitted from the surface of the diffusion member 13 is incident on the back surface of the main portion 121 of the convex light guide 12. The light incident on the convex light guide 12 emerges from the projecting portion 122. Therefore, it may appear for a viewer that a part of the facing member 11 emits light in a stripe shape.

Figure 5:
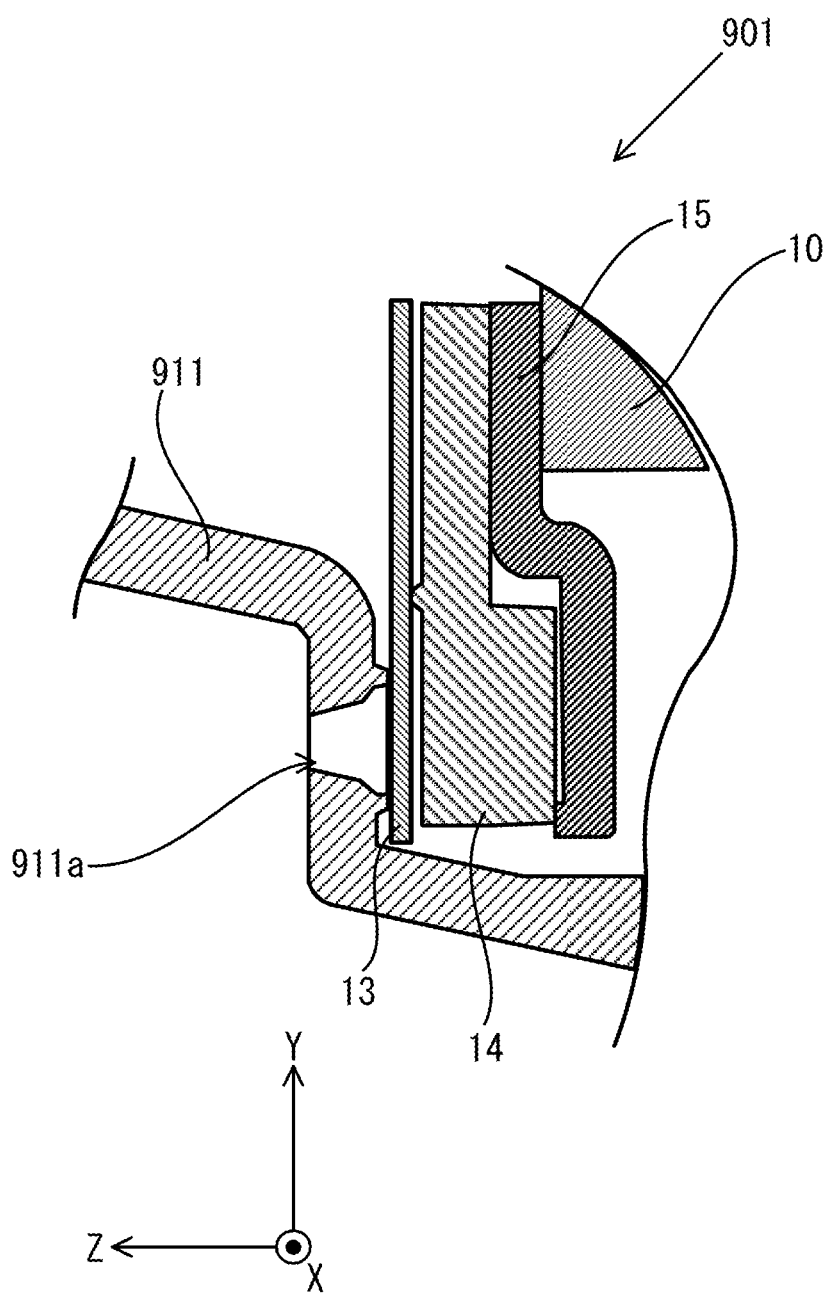
FIG. 5 is a cross-sectional view of a vehicular display device according to a Comparative Example.

Next, the configuration of the vehicular display device 1 according to the embodiment is described in comparison with a Comparative Example. As shown in FIG. 5, in a vehicular display device 901 according to the Comparative Example, a hole 911a is formed in a facing member 911 at a position facing a part of the diffusion member 13. In FIG. 5, like reference numerals used in FIG. 4 are given to components similar to those of the vehicular display device 1 according to the embodiment. The outer peripheral portion of the hole 911a in the facing member 911 is in contact with the diffusion member 13. When the vehicular display device 1 is viewed from the front side thereof, a part of the diffusion member 13 is directly visible through the hole 911a of the facing member 911. Therefore, when the luminance fleck of the light emitted from the light-edge light guide 14 toward the diffusion member 13 is not sufficiently eliminated by the diffusion member 13, for example, the luminance fleck is visible from the front of the vehicular display device 901. Accordingly, it is likely that the user may have an impression that a good appearance is spoiled. Further, in the vehicular display device 901 according to the Comparative Example, there is a step (recess) in the design portion 11b of the facing member 911. When the vehicular display device 901 is viewed from the front side, therefore, the depth side of the step (recess) of the facing member 911 seems to be bright. Therefore, it is likely that the user may have an impression that the design portion 11b is not flat or is not be integral.

On the other hand, in the vehicular display device 1 according to the embodiment, as shown in FIG. 4, the convex light guide 12 provided with the light diffusing part 123 is interposed between the diffusion member 13 and the facing member 11. As a result, the light diffusing part 123 eliminates the luminance fleck of the light emitted from the light-edge light guide 14 toward the diffusion member 13. Therefore, the appearance of the vehicular display device 1 is improved. The vehicular display device 1 according to the embodiment does not have a step (recess) in the design portion 11b when viewing the facing member 11 from the front side. Therefore, it is possible to given the user an impression that the design part 11b appears flat or integral.

As described above, the vehicular display device 1 according to the embodiment includes the convex light guide 12 that has the main portion 121 interposed between the diffusion member 13 and the facing member 11, and the projecting portion 122 projecting into the hole 11a of the facing member 11 from the main portion 121. This structure prevents the diffusion member 13 from being directly visible from the front side through the hole 11a of the facing member 11. Further, the convex light guide 12 has the light diffusing part 123 near the +Z-wise surface including the portion exposed through the hole 11a of the projecting portion 122. As a result, even if the luminance fleck that cannot be sufficiently reduced by the diffusion member 13 exists, the luminance fleck is eliminated by the light diffusing part 123, so that the quality of illumination is improved. Therefore, the appearance of the upper edge portion of the display unit 17 in the vehicular display device 1 is improved, thus improving the design of the vehicular display device 1.

In the vehicular display device 1 according to the embodiment, the height H1 of the projecting portion 122 of the convex light guide 12 in the projecting direction is substantially equal to the thickness T1 of the outer peripheral portion of the hole 11a in the facing member 11. As a result, the portion of the facing member 11 that covers the upper edge of the display unit 17 becomes flat, which also brings about an advantage such that the appearance of the vehicular display device 1 is improved.

Furthermore, as shown in FIG. 4, the projecting portion 122 of the convex light guide 12 according to the embodiment has, in a cross section parallel to the projecting direction of the projecting portion 122 (the Z-axial direction in FIG. 4), the width W12 of the proximal end portion on the main portion 121 side (−Z-wise side) is larger than the width W11 of the distal end portion on the side (+Z-wise side) opposite to the main portion 121. Accordingly, the boundary portion between the main portion 121 of the convex light guide 12 and the projecting portion 122 is positioned outside the hole 11a when viewing from the front side (+Z-wise side) of the facing member 11. This makes it difficult for the user who observes the design portion 11b from the front of the design portion 11b of the facing member 11 to view the boundary portion between the main portion 121 and the projecting portion 122, which brings about an advantage such that degrading the appearance of the vehicular display device 1 can be prevented.

Figure 6A:
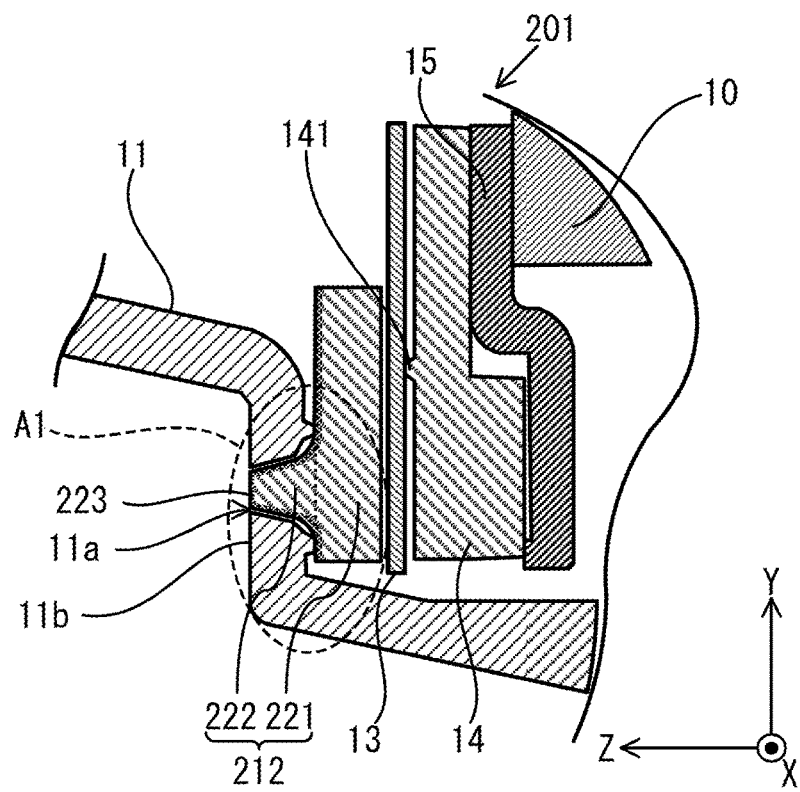
FIG. 6A is a cross-sectional view of a vehicular display device according to a modification of the invention.
Figure 6B:
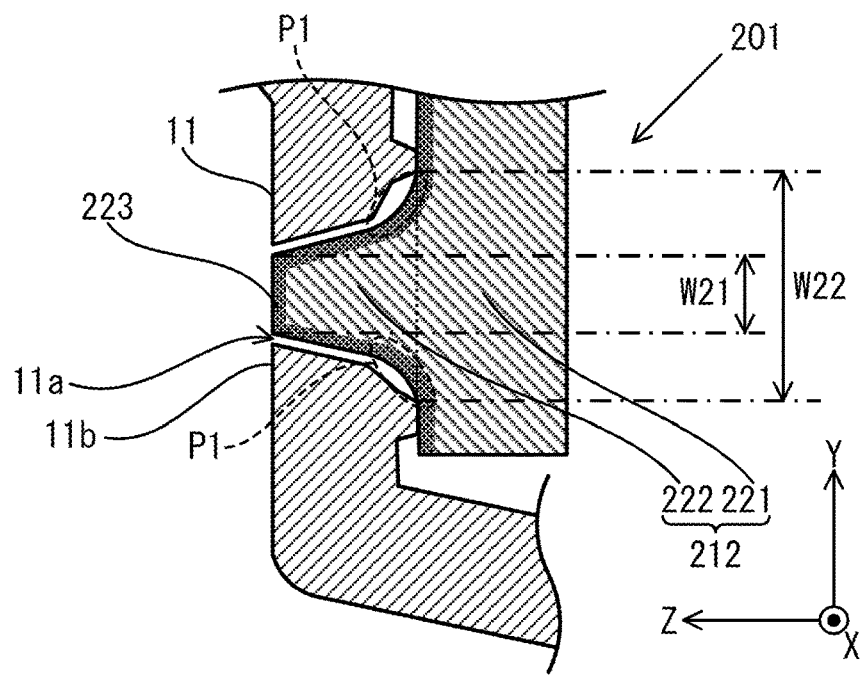
FIG. 6B is an enlarged view of a portion A1 encircled by a broken line in FIG. 6A.

Although the embodiment of the invention has been described above, the invention is not limited to the configuration of the embodiment. For example, the configuration may be modified like that of a vehicular display device 201 shown in FIG. 6A and FIG. 6B which is an enlarged view of FIG. 6A, where a projecting portion 222 of a convex light guide 212 has a flare portion P1, at its proximal end portion, bent to be a convex toward a main portion 221. In FIGS. 6A and 6B, like reference numerals used in FIG. 4 are given to components similar to those of the embodiment.

The surface of the main portion 221 on the projecting portion 222 side and the side surface of the projecting portion 222 are smoothly continuous through the flare portion P1. In the cross section parallel to the projecting direction of the projecting portion 222 (the Z-axial direction in FIGS. 6A and 6B), the width, W22, of the projecting portion 222 of the proximal end portion on the main portion 221 side (−Z-wise side) is larger than the width, W21, of the distal end portion on the opposite side (+Z-wise side) to the main portion 221 side. In addition, a light diffusing part 223 is formed in the vicinity of the surface of the convex light guide 212.

According to this configuration, a flare portion P1 is formed at the proximal end portion of the projecting portion 222 on the main portion 221 side. Accordingly, the side surface of the projecting portion 222 and the surface of the main portion 221 on the projecting portion 222 side are smoothly continuous. Even when the user looks into the hole 11a of the facing member 11 from a direction (oblique direction) intersecting the projecting direction (+Z direction) of the projecting portion 222, therefore, the boundary portion between the projecting portion 222 and the main portion 221 is not visible. Therefore, the appearance of the vehicular display device 1 is improved.

Although the vehicular display device 1 including the convex light guide 12 having the light diffusing part 123 has been described with respect to the embodiment, the configuration of the convex light guide 12 is not limited to such a configuration. For example, the vehicular display device may use a convex light guide (not shown) formed of a material that transmits only light of a preset wavelength band in the wavelength band of visible light. The "preset wavelength band" is set to, for example, a long wavelength band (for example, a wavelength band of 500 nm or more) in the wavelength band of visible light. In this case, the convex light guide is formed of a translucent material that blocks, for example, light of a band having a wavelength shorter than 500 nm (including the wavelength band of ultraviolet rays). It should be noted that the "predetermined wavelength band" may be set to a wavelength band of, for example, 780 nm or more. In this case, the convex light guide is formed from a so-called dark color material that transmits only infrared rays.

Furthermore, the convex light guide may be made of, for example, a material obtained by dispersing, into a transparent base material, transparent fine particles with a refractive index different from that of the base material. In this case, the convex light guide itself functions as a diffusion layer or a diffusion member. In this case, since the convex light guide is opalescent, a part of the diffusion member 13 is prevented from being visible from the front side of the vehicular display device.

In the description of the embodiment, an example in which one hole 11a, one convex light guide 12, one diffusion member 13, one light guide 14 and one reflector 15 are disposed is illustrated. However, the number of each member is optional. Similarly, although two LEDs are exemplified as the light source, any type of light source that emits light may be available, and the quantity thereof is optional.

The invention provides a vehicular display device that prevents the diffusion member from being directly visible from the front side through the hole of the facing member, and has a good appearance.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A vehicular display device comprising:
   a light source;
   a light guide that guides light emitted from the light source;
   a diffusion member that diffuses at least part of the light emitted from the light guide;
   a facing member having a hole provided therein so that a portion where the hole is provided overlaps at least a part of the diffusion member; and
   a convex light guide having a main portion interposed between the diffusion member and the facing member and a projecting portion projecting into the hole from the main portion.

2. The vehicular display device according to claim 1, wherein
   the convex light guide has a light diffusing part that diffuses light at a portion exposed through the hole in the projecting portion.

3. The vehicular display device according to claim 2, wherein the light diffusing part is formed on the whole projecting portion of the convex light guide and around the base portion of the projecting portion.

4. The vehicular display device according to claim 1, wherein the convex light guide has a transparent base material and transparent fine particles dispersed in the transparent base material and having a refractive index different from that of the transparent base material.

5. The vehicular display device according to claim 1, wherein the convex light guide is opalescent.

6. The vehicular display device according to claim 1, wherein the convex light guide is made of a material that transmits only light of a preset wavelength band.

7. The vehicular display device according to claim 1, wherein the height of the projecting portion in a projecting direction and the thickness of an outer peripheral portion of the hole in the facing member are substantially equal to each other.

8. The vehicular display device according to claim 1, wherein the projecting portion has a shape in which the width of a proximal end portion on the main portion side is larger than the width of a distal end portion on the opposite side to the main portion side in a cross section parallel to the projecting direction of the projecting portion.

9. The vehicular display device according to claim 8, wherein the hole of the facing member has a shape corresponding to the shape of the projecting portion in a cross section parallel to the projecting direction of the projecting portion.

10. The vehicular display device according to claim 2, wherein
   the projecting portion has a shape in which the width of a proximal end portion on the main portion side is larger than the width of a distal end portion on the opposite side to the main portion side in a cross section parallel to the projecting direction of the projecting portion, and
   the light diffusing part has a flare portion curved to be a convex toward the main portion at the proximal end portion.

11. The vehicular display device according to claim 1, wherein the light guide and the diffusion member face each other with a gap therebetween.

12. The vehicular display device according to claim 1, wherein the diffusion member and the convex light guide face each other with a gap therebetween.

* * * * *